(12) United States Patent
Taguchi

(10) Patent No.: US 11,945,122 B2
(45) Date of Patent: Apr. 2, 2024

(54) ROBOT CONTROL METHOD AND ROBOT SYSTEM

(71) Applicant: Seiko Epson Corporation, Tokyo (JP)

(72) Inventor: Makoto Taguchi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 204 days.

(21) Appl. No.: 17/514,147

(22) Filed: Oct. 29, 2021

(65) Prior Publication Data

US 2022/0134564 A1    May 5, 2022

(30) Foreign Application Priority Data

Oct. 30, 2020    (JP) ................................ 2020-182752

(51) Int. Cl.
*B25J 9/16*    (2006.01)
*B25J 9/00*    (2006.01)
*B25J 13/08*   (2006.01)

(52) U.S. Cl.
CPC .......... *B25J 9/1687* (2013.01); *B25J 9/0093* (2013.01); *B25J 9/1633* (2013.01); *B25J 13/085* (2013.01); *B25J 13/088* (2013.01)

(58) Field of Classification Search
CPC ...... B25J 9/1687; B25J 9/0093; B25J 9/1633; B25J 13/085; B25J 13/088; B25J 9/1664; B25J 9/1679; G05B 2219/39102; G05B 2219/39529; G05B 2219/40032; G05B 2219/40554
See application file for complete search history.

(56) References Cited

U.S. PATENT DOCUMENTS

| | | | | |
|---|---|---|---|---|
| 2008/0267737 A1* | 10/2008 | Hatanaka | ............... | B25J 9/1687 901/27 |
| 2008/0312769 A1* | 12/2008 | Sato | ....................... | B25J 9/1687 901/31 |
| 2013/0197696 A1* | 8/2013 | Nammoto | .............. | B25J 9/1633 700/258 |

(Continued)

FOREIGN PATENT DOCUMENTS

| | | |
|---|---|---|
| JP | 2015-174171 A | 10/2015 |
| JP | 2018-083284 A | 5/2018 |
| JP | 2020-040782 A | 3/2020 |

*Primary Examiner* — Adam R Mott
*Assistant Examiner* — Sagar Kc
(74) *Attorney, Agent, or Firm* — Harness, Dickey & Pierce, P.L.C.

(57) ABSTRACT

A robot control method for a robot performing an insertion operation of inserting a second target object with force control into a first target object conveyed by a conveyor device is provided. The robot control method includes: a follow step of causing the second target object to follow the first target object from an operation start location, based on a conveyance speed of the first target object; a contact step of bringing the second target object into contact with the first target object, the second target object being in a tilted attitude in relation to the first target object, with the force control; an attitude change step of changing the attitude of the second target object in such a way that the tilt in relation to the first target object is eliminated, while pressing the second target object against the first target object, with the force control; and an insertion step of inserting the second target object into the first target object.

5 Claims, 10 Drawing Sheets

(56) References Cited

U.S. PATENT DOCUMENTS

| | | | |
|---|---|---|---|
| 2015/0127158 A1* | 5/2015 | Shimodaira | G05B 19/401 |
| | | | 901/41 |
| 2018/0029234 A1* | 2/2018 | Ueda | B25J 9/1633 |
| 2018/0339414 A1* | 11/2018 | Taguchi | B25J 9/1633 |
| 2019/0126483 A1* | 5/2019 | Haddadin | B25J 9/1669 |
| 2019/0232491 A1* | 8/2019 | Ooba | B25J 9/1664 |
| 2019/0232492 A1* | 8/2019 | Takeuchi | B25J 9/1656 |
| 2019/0275678 A1* | 9/2019 | Takeuchi | B25J 13/085 |

\* cited by examiner

ROBOT CONTROL METHOD AND ROBOT SYSTEM

The present application is based on, and claims priority from JP Application Serial Number 2020-182752, Oct. 30, 2020, the disclosure of which is hereby incorporated by reference herein in its entirety.

BACKGROUND

1. Technical Field

The present disclosure relates to a robot control method and a robot system.

2. Related Art

JP-A-2015-174171 discloses a robot control device that controls a robot performing an operation on a workpiece conveyed by a conveyor device.

However, in the technique described in JP-A-2015-174171, depending on the time taken for the operation, the workpiece may move out of the movement range of the robot before the operation on the workpiece is completed. Therefore, a robot that can finish an operation more accurately in a shorter time is desired.

SUMMARY

A robot control method according to an aspect of the disclosure is a robot control method for a robot performing an insertion operation of inserting a second target object with force control into a first target object conveyed by a conveyor device is provided. The robot control method includes: a follow step of causing the second target object to follow the first target object from an operation start location, based on a conveyance speed of the first target object; a contact step of bringing the second target object into contact with the first target object, the second target object being in a tilted attitude in relation to the first target object, with the force control; an attitude change step of changing the attitude of the second target object in such a way that the tilt in relation to the first target object is eliminated, while pressing the second target object against the first target object, with the force control; and an insertion step of inserting the second target object into the first target object.

A robot system according to another aspect of the disclosure includes: a conveyance device conveying a first target object; a robot performing an insertion operation of inserting the first target object into a second target object with force control; and a control device controlling the robot. The control device controls driving of the robot to perform: a follow step of causing the second target object to follow the first target object from an operation start location, based on a conveyance speed of the first target object; a contact step of bringing the second target object into contact with the first target object, the second target object being in a tilted attitude in relation to the first target object, with the force control; an attitude change step of changing the attitude of the second target object in such a way that the tilt in relation to the first target object is eliminated, while pressing the second target object against the first target object, with the force control; and an insertion step of inserting the second target object into the first target object.

DESCRIPTION OF EXEMPLARY EMBODIMENTS

Embodiments will now be described with reference to the drawings.

First Embodiment

Figure 1:
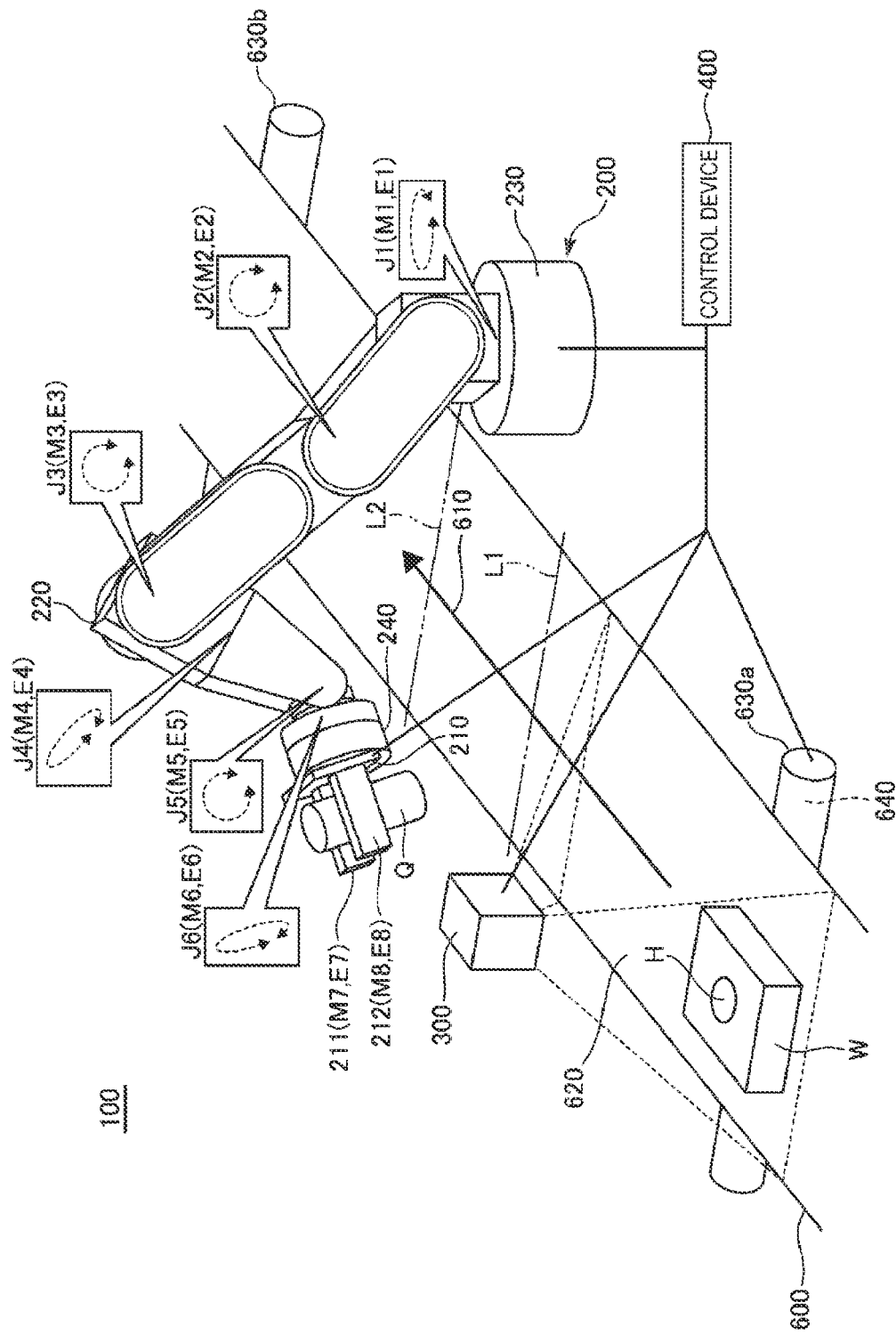
FIG. 1 shows an overall configuration of a robot system according to a first embodiment.
Figure 2:
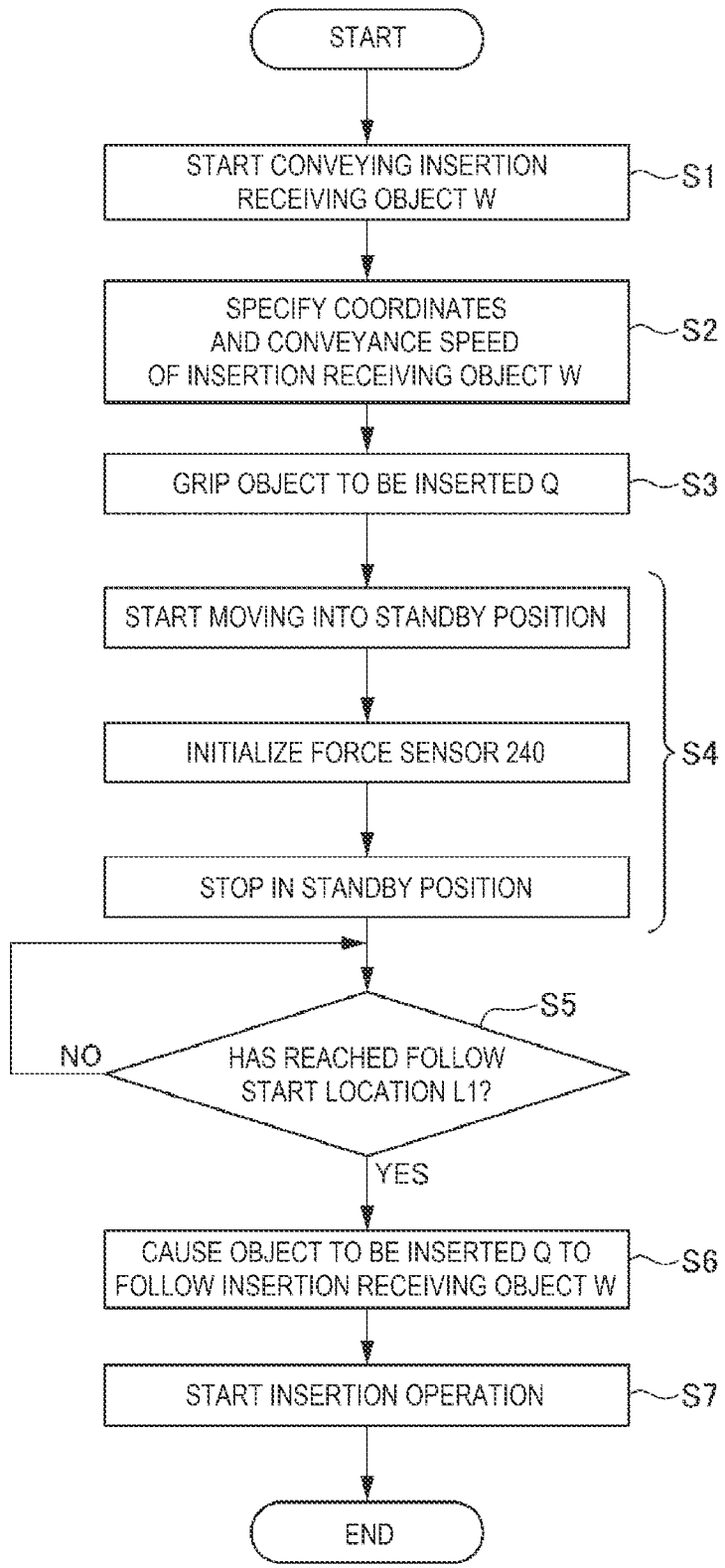
FIG. 2 is a flowchart showing a driving process of the robot system.
Figure 3:
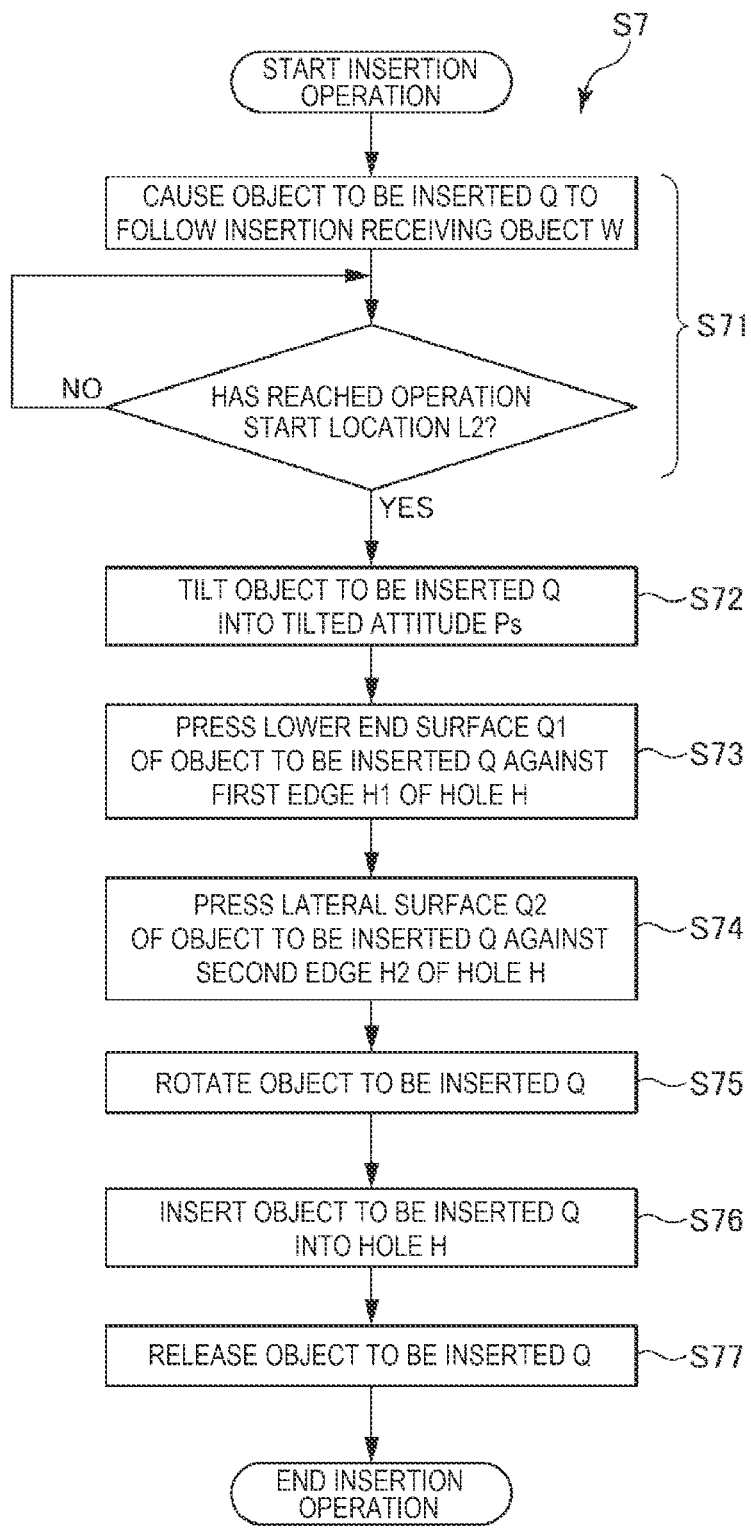
FIG. 3 is a flowchart showing a process of an insertion operation.

FIG. 1 shows an overall configuration of a robot system according to a first embodiment. FIG. 2 is a flowchart showing a driving process of the robot system. FIG. 3 is a flowchart showing a process of an insertion operation. FIGS. 4 to 9 are cross-sectional views for explaining the insertion operation. The upper side in FIGS. 4 to 9 is the upper side in the vertical direction. The lower side in FIGS. 4 to 9 is the lower side in the vertical direction.

A robot system 100 shown in FIG. 1 has a robot 200, a location sensor 300, a control device 400, and a conveyor device 600. In the robot system 100 having such a configuration, the conveyor device 600 is driven under the control of the control device 400 and conveys an insertion receiving object W, which is a first target object, along a direction of conveyance 610. The control device 400 detects the state of conveyance of the insertion receiving object W, based on image information acquired by the location sensor 300. The robot 200 is driven under the control of the control device 400 and performs an insertion operation of inserting an object to be inserted Q, which is a second target object, into a hole H in the insertion receiving object W while following the insertion receiving object W that is being conveyed. The insertion receiving object W is any object on which the robot 200 can perform an operation, such as an industrial product like a printer or an automobile, or a component of such a product. In this embodiment, for the sake of convenience of the description, the insertion receiving object W has a closed-end hole H, and an operation of inserting the object to be inserted Q into this hole H is described as a representative example of the insertion operation. However, the insertion operation is not particularly limited, provided that the second target object is inserted into the first target object. The target site where the object to be inserted Q is inserted is not limited to the hole H and may be a groove.

The robot 200 has a base 230 fixed to a floor, a manipulator 220 supported by the base 230, and an end effector 210 supported by the manipulator 220. The manipulator 220 is a robotic arm formed of a plurality of arms coupled together to be rotationally movable. In this embodiment, the manipulator 220 is a six-axis arm having six joints J1 to J6. Of these joints, the joints J2, J3, J5 are bending joints and the joints J1, J4, J6 are torsion joints. However, the manipulator 220 is not particularly limited, provided that the manipulator 220 can perform the foregoing insertion operation.

Motors M1, M2, M3, M4, M5, M6 and encoders E1, E2, E3, E4, E5, E6 are installed at the joints J1, J2, J3, J4, J5, J6, respectively. The control device 400 executes feedback control to cause the rotation angles of the joints J1 to J6 indicated by outputs from the encoders E1 to E6 to coincide with their respective target rotation angles during the operation of the robot system 100. Thus, each of the joints J1 to J6 can be maintained at their respective target rotation angles and the manipulator 220 can be placed in a desired location and attitude. Therefore, the robot 200 can be driven stably in a desired operation. In the description below, the "location and attitude" may be referred to as a "position".

At the distal end part of the manipulator 220, that is, at the joint J6, the end effector 210 is installed via a mechanical interface. The end effector 210 has a pair of claw parts 211, 212 and closes and opens the pair of claw parts 211, 212 to grip and release the object to be inserted Q. However, the end effector 210 is not particularly limited, provided that the end effector 210 can grip and release the object to be inserted Q. For example, the end effector 210 may be configured to suck the object to be inserted Q via an air chuck or attract the object to be inserted Q via an electromagnetic chuck or the like and thus grip the object to be inserted Q.

Motors M7, M8 and encoders E7, E8 are installed at the claw parts 211, 212, respectively. The control device 400 executes feedback control to cause the separation distance between the claw parts 211, 212 indicated by outputs from the encoders E7, E8 to coincide with a target separation distance, which is a control target, during the operation of the robot system 100. Thus, the separation distance between the claw parts 211, 212 can be maintained to be the target separation distance and the object to be inserted Q can be gripped and released properly.

At the joint J6 of the manipulator 220, a force sensor 240 acquiring an acting force acting on the insertion receiving object W from the end effector 210 is installed. The force sensor 240 measures forces along three axes that act on the object to be inserted Q and torques about the three axes, in a sensor coordinate system, which is a unique three-dimensional orthogonal coordinate system. The site where the force sensor 240 is installed is not particularly limited. The force sensor 240 may also be installed at the other joints J1 to J5.

The conveyor device 600 is a belt conveyor and has a belt 620 and conveyor rollers 630*a*, 630*b* moving the belt 620. However, the conveyor device 600 is not limited to a belt conveyor and may be any device that can convey the insertion receiving object W along the direction of conveyance 610.

The conveyor device 600 moves a conveyance surface via the conveyor rollers 630*a*, 630*b* and thus conveys the insertion receiving object W placed on the conveyance surface, in the direction of conveyance 610. The conveyor roller 630*a* is provided with a conveyance amount sensor 640 outputting a signal corresponding to the amount of rotation of the conveyor roller 630*a* to the control device 400. The control device 400 executes feedback control to cause the conveyance speed of the insertion receiving object W indicated by the output from the conveyance amount sensor 640 to coincide with a target conveyance speed, which is a control target. Thus, the conveyance speed of the insertion receiving object W can be maintained to be the target conveyance speed and the insertion receiving object W can be conveyed stably at a desired speed.

The location sensor 300 detects the location of the insertion receiving object W from above the conveyor device 600. The location sensor 300 is a camera outputting an image of the insertion receiving object W to the control device 400. However, the location sensor 300 is not limited to a camera. For example, a laser range scanner or the like may be employed. The location sensor 300 has an angle of view that covers the insertion receiving object W conveyed on the belt 620, as indicated by dashed lines in FIG. 1. A location in the image outputted from the location sensor 300 is associated with a location in the conveyance path by the control device 400. Therefore, when the insertion receiving object W is present within the angle of view of the location sensor 300, the coordinates of the insertion receiving object W can be specified, based on the location of the insertion receiving object W in the image from the location sensor 300.

The control device 400 controls the driving of the robot 200, the location sensor 300, and the conveyor device 600. Such a control device 400 is formed of a computer, for example, and has a processor (CPU) processing information, a memory communicatively coupled to the processor, and an external interface for coupling to an external device. Various programs executable by the processor are saved in the memory. The processor can read and execute the various programs stored in the memory. A part or all of the components of the control device 400 may be arranged inside the casing of the robot 200. Also, the control device 400 may be formed of a plurality of processors.

The overall configuration of the robot system 100 has been described. An insertion operation using the robot system 100 will now be described, referring to the flowchart shown in FIG. 2.

First, in step S1, the control device 400 drives the conveyor rollers 630*a*, 630*b* of the conveyor device 600 to turn the belt 620 and start to convey the insertion receiving object W. Specifically, the control device 400 executes feedback control to cause the conveyance speed of the insertion receiving object W indicated by the output from the conveyance amount sensor 640 to coincide with a target conveyance speed, which is a control target. Thus, the insertion receiving object W is conveyed in the direction of conveyance 610 at the target conveyance speed.

Next, in step S2, the control device 400 acquires an image of the insertion receiving object W from the location sensor 300 and specifies the coordinates of the insertion receiving object W, based on the location of the insertion receiving object W in the acquired image. As the coordinates and the conveyance speed of the insertion receiving object W are thus made known, which point the insertion receiving object W passes at what time is found. The control device 400 can also successively acquire images of the insertion receiving object W at very short time intervals from the location sensor 300 and detect the conveyance speed of the insertion receiving object W, based on a change in the coordinates of the insertion receiving object W during the short time.

Next, in step S3, the control device 400 controls the driving of the robot 200 to grip the object to be inserted Q that is to be inserted into the insertion receiving object W. Step S3 may be executed prior to or in parallel with step S1 or step S2.

Next, in step S4, the control device 400 controls the driving of the robot 200 to move the manipulator 220 into a standby position. In the course of moving the manipulator 220 into the standby position, the control device 400 initializes the force sensor 240 in a section where the object to be inserted Q moves at a constant velocity along the direction of conveyance 610. In short, the output signal from the force sensor 240 in the state where the object to be inserted Q is moved at a constant velocity along the direction of conveyance 610, that is, in the state of uniform motion, is zero. Thus, a noise signal generated due to factors other than the contact with the insertion receiving object W during an insertion operation S7, described later, can be reduced, and the state of contact with the insertion receiving object W can be detected more accurately. Therefore, accurate force control can be performed and the insertion operation S7 can be performed accurately and smoothly. Also, since the force sensor 240 can be initialized during the operation of the manipulator 220, the waiting time for the initialization of the force sensor 240 can be reduced and the operation cycle time can be made shorter. The timing of initializing the force sensor 240 is not particularly limited, provided that the initialization is performed before the object to be inserted Q is inserted into the insertion receiving object W. For example, the initialization may be performed during step S71, described later.

Next, in step S5, the control device 400 controls the driving of the robot 200 to maintain the standby position until the insertion receiving object W reaches a follow start location L1. When the insertion receiving object W has reached the follow start location L1, the control device 400 in step S6 controls the driving of the robot 200 and thus causes the object to be inserted Q to follow the insertion receiving object W. Specifically, the control device 400 causes the object to be inserted Q to move parallel to and directly above the insertion receiving object W. After a preparation step as described above, the insertion operation S7 of inserting the object to be inserted Q into the insertion receiving object W is started. The insertion operation S7 will now be described, referring to the flowchart shown in FIG. 3.

In the insertion operation S7, first, in step S71, the control device 400 controls the driving of the robot 200 to cause the object to be inserted Q to continue following the insertion receiving object W until the insertion receiving object W reaches an operation start location L2 located downstream of the follow start location L1. When the insertion receiving object W has reached the operation start location L2, the control device 400 executes the steps described below while causing the object to be inserted Q to follow the insertion receiving object W.

Figure 4:
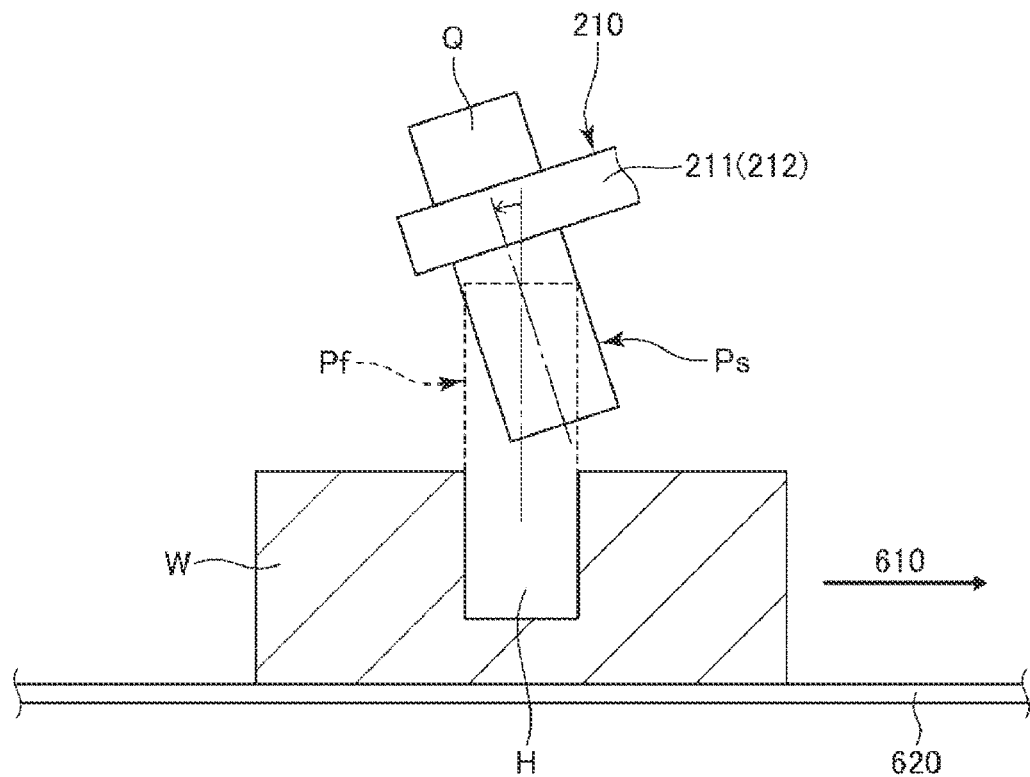
FIG. 4 is a cross-sectional view for explaining the insertion operation.

First, in step S72, the control device 400 controls the driving of the robot 200 to tilt the object to be inserted Q in relation to the insertion receiving object W, as shown in FIG. 4. Tilting in this case means tilting the object to be inserted Q in relation to a completion attitude Pf corresponding to the state where the insertion of the object to be inserted Q into the insertion receiving object W is complete. Hereinafter, this attitude is also referred to as a "tilted attitude Ps". Particularly in the tilted attitude Ps in this embodiment, the object to be inserted Q is tilted to the side opposite to the direction of conveyance 610 so that an insertion distal end (lower end) side of the object to be inserted Q is located downstream of an insertion proximal end (upper end) side of the object to be inserted Q along the direction of conveyance 610. Step S72 may be executed at any timing before step S73, described later, and may be executed before the insertion operation starts.

Figure 5:
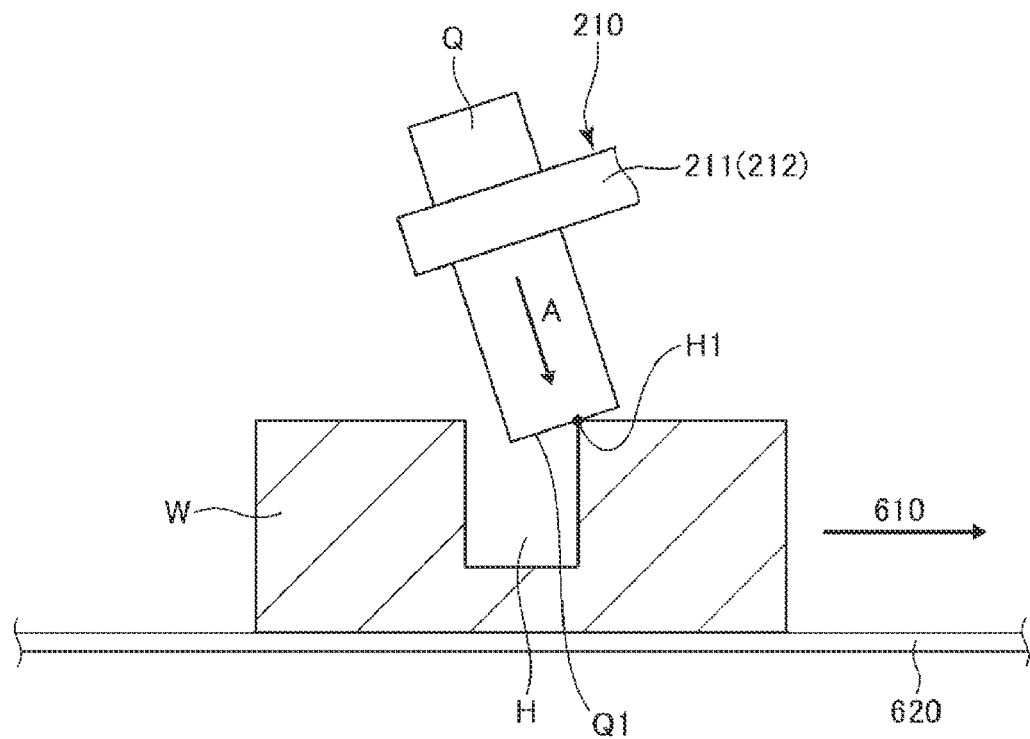
FIG. 5 is a cross-sectional view for explaining the insertion operation.

Next, in step S73, the control device 400 controls the driving of the robot 200 to move the object to be inserted Q toward the insertion receiving object W along an arrow A indicating the tilting direction of the object to be inserted Q and thus press a lower end surface Q1 of the object to be inserted Q against a first edge part H1 located downstream along the direction of conveyance 610 of the hole H in the insertion receiving object W, while maintaining the object to be inserted Q in the tilted attitude Ps, as shown in FIG. 5. At this point, the control device 400 detects the contact between the object to be inserted Q and the first edge part H1, based on the output from the force sensor 240, and controls the press force of the object to be inserted Q against the first edge part H1, based on the output from the force sensor 240. In short, the control device 400 executes step S73 by force control. Specifically, the control device 400 executes feedback control to cause the press force indicated by the output from the force sensor 240 to coincide with a target press force, which is a control target. Thus, the press force can be maintained to be the target press force and the object to be inserted Q can be pressed against the first edge part H1 with a proper force that is neither excessive nor insufficient. Therefore, the subsequent operation can be performed stably. Also, the probability of an unstable relative positional relationship between these two parts due to weak pressing, or misalignment of or damage to the insertion receiving object W due to strong pressing, can be reduced.

Figure 6:
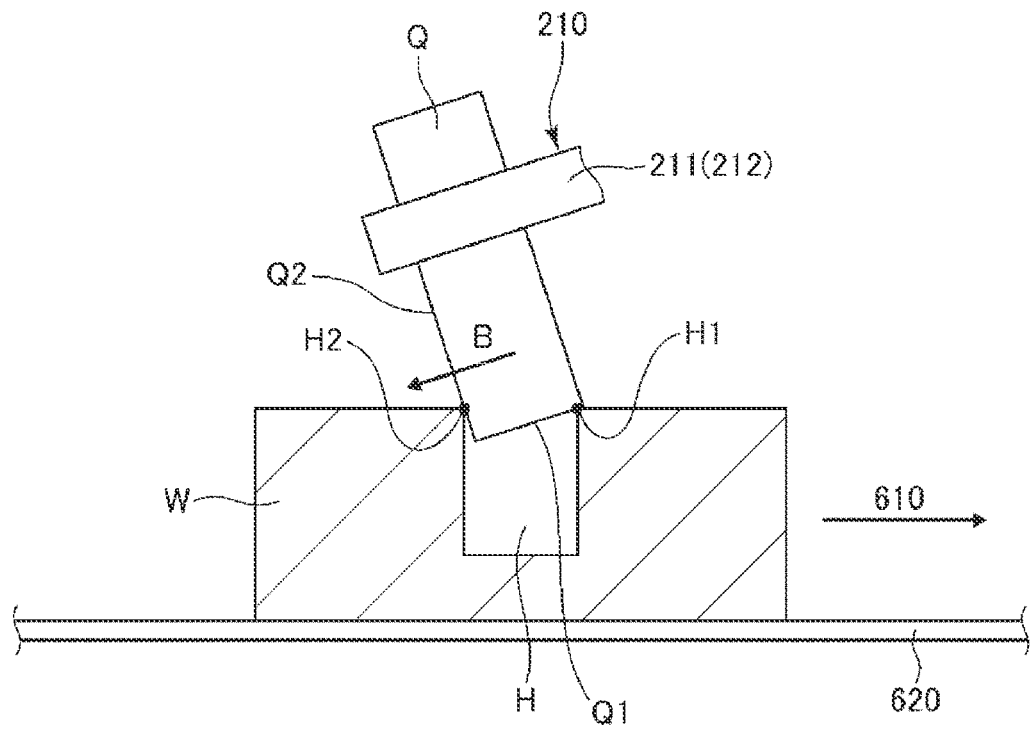
FIG. 6 is a cross-sectional view for explaining the insertion operation.

Next, in step S74, the control device 400 controls the driving of the robot 200 to move the object to be inserted Q upstream along the direction of conveyance 610, along an arrow B orthogonal to the arrow A, while pressing the lower end surface Q1 against the first edge part H1, and thus press a lateral surface Q2 of the object to be inserted Q against a second edge part H2 located upstream along the direction of conveyance 610 of the hole H, while maintaining the object to be inserted Q in the tilted attitude Ps, as shown in FIG. 6. At this point, the control device 400 controls the press force of the object to be inserted Q against the first edge part H1, detects the contact between the lateral surface Q2 and the second edge part H2, and controls the press force of the object to be inserted Q against the second edge part H2, based on the output from the force sensor 240. In short, the control device 400 executes step S74 by force control. Specifically, the control device 400 executes feedback control to cause the press force indicated by the output from the force sensor 240 to coincide with a target press force, which is a control target. Thus, the press force can be maintained to be the target press force and the object to be inserted Q can be pressed against the first edge part H1 and the second edge part H2 with a proper force that is neither excessive nor insufficient. Therefore, the subsequent operation can be performed stably. Also, the probability of an unstable relative positional relationship between these two parts due to weak pressing, or misalignment of or damage to the insertion receiving object W due to strong pressing, can be reduced. Since the object to be inserted Q is tilted to the side opposite to the direction of conveyance 610, the movement of the lateral surface Q2 and the second edge part H2 toward each other is achieved by the manipulator 220 moving the object to be inserted Q upstream along the direction of conveyance 610, along the arrow B, and by the conveyor device 600 moving the insertion receiving object W in the direction of conveyance 610. Therefore, the distance of movement of the object to be inserted Q by the manipulator 220 can be made shorter and the operation time can be reduced. Also, the movement of the lateral surface Q2 and the second edge part H2 toward each other may be achieved by only the conveyor device 600 moving the insertion receiving object W in the direction of conveyance 610 without the manipulator 220 moving the object to be inserted Q.

Figure 7:
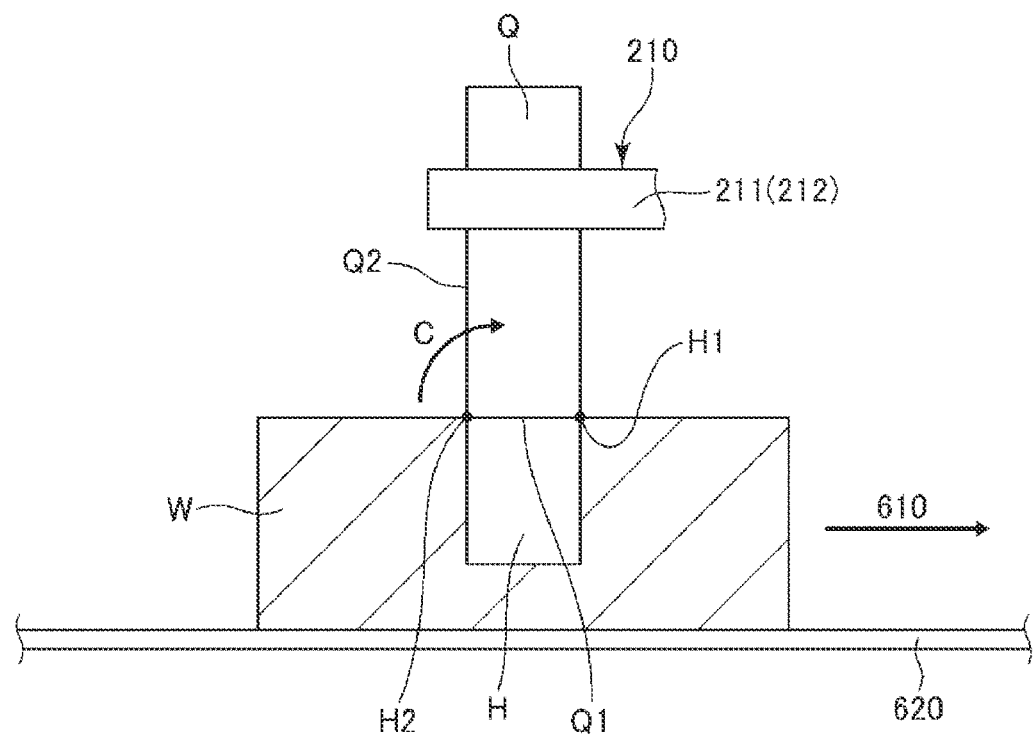
FIG. 7 is a cross-sectional view for explaining the insertion operation.

Next, in step S75, the control device 400 controls the driving of the robot 200 to rotate the object to be inserted Q as indicated by an arrow C about the second edge part H2 as the fulcrum until the tilt in relation to the completion attitude Pf is substantially eliminated, while pressing the lateral surface Q2 of the object to be inserted Q against the second edge part H2, as shown in FIG. 7. At this point, the control device 400 controls the driving of the robot 200 in such a way that the press force of the object to be inserted Q against the second edge part H2 is maintained to be a target press force. In short, the control device 400 executes step S75 by force control. Specifically, the control device 400 executes feedback control to cause the press force indicated by the output from the force sensor 240 to coincide with the target press force, which is a control target. Thus, the press force can be maintained to be the target press force and the object to be inserted Q can be rotated while the object to be inserted Q is pressed against the second edge part H2 with a proper force that is neither excessive nor insufficient.

Figure 8:
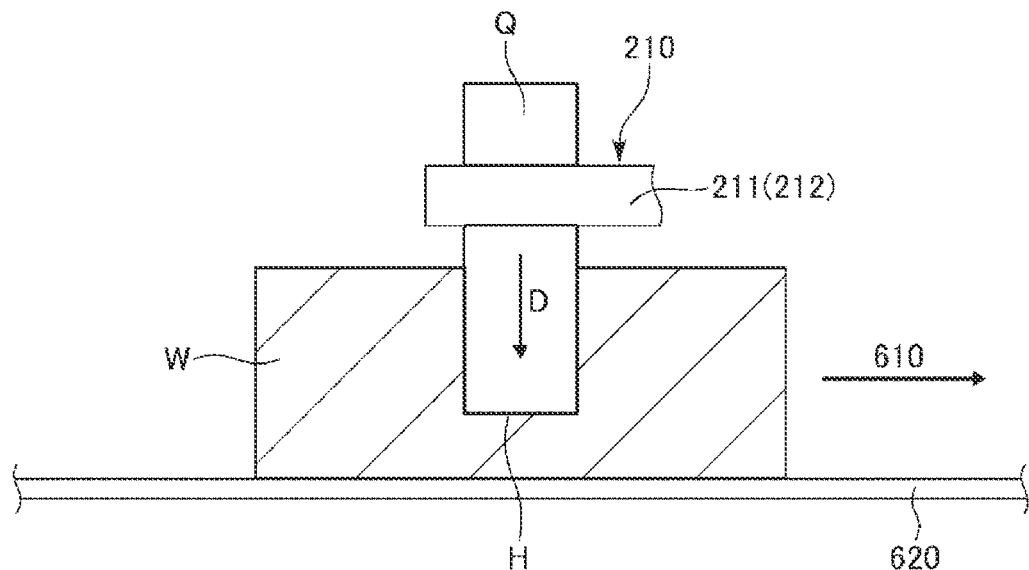
FIG. 8 is a cross-sectional view for explaining the insertion operation.

Next, in step S76, the control device 400 controls the driving of the robot 200 to move the object to be inserted Q downward along an arrow D pointing vertically downward and thus insert the object to be inserted Q into the hole H, as shown in FIG. 8. At this point, the control device 400 detects the completion of the insertion of the object to be inserted Q, based on the output from the force sensor 240. The insertion of the object to be inserted Q into the hole H is thus completed. Steps S75, S76 are executed in two actions but may be executed in one action, that is, simultaneously. In short, the object to be inserted Q may be energized downward along the arrow D and rotated along the arrow C about the second edge part H2 as the fulcrum at the same time. Thus, the object to be inserted Q is inserted into the hole H, at the point when the tilt is reduced and the object to be inserted Q is placed in an attitude where the object to be inserted Q can be inserted into the hole H.

Figure 9:
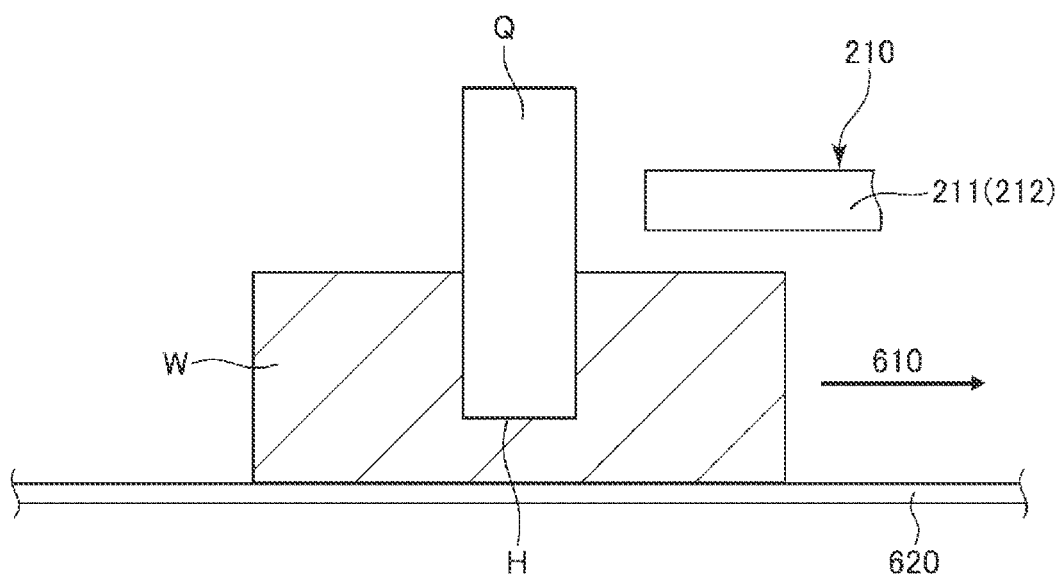
FIG. 9 is a cross-sectional view for explaining the insertion operation.

Next, in step S77, the control device 400 controls the driving of the robot 200 to release the object to be inserted Q from the end effector 210, as shown in FIG. 9. At this point, the control device 400 releases the object to be inserted Q while controlling the state of contact between the end effector 210 and the object to be inserted Q, based on the output from the force sensor 240, so that an excessive stress is not applied to the object to be inserted Q. In short, the control device 400 executes feedback control to make the stress indicated by the output from the force sensor 240 equal to or less than a predetermined threshold, during the release operation. Thus, the application of an excessive stress to the object to be inserted Q, when being released, can be restrained.

In such a method, before the object to be inserted Q is inserted into the hole H, the object to be inserted Q is pressed against the hole H and the attitude of the object to be inserted Q in relation to the hole H is adjusted in the pressed state. Therefore, the relative position of the object to be inserted Q in relation to the hole H can be easily controlled. Particularly in this embodiment, in step S75, the attitude of the object to be inserted Q in relation to the hole H is adjusted while the lateral surface Q2 of the object to be inserted Q is pressed against the hole H. Therefore, the effect thereof is prominent. The object to be inserted Q is inserted into the hole H more smoothly and easily than, for example, when the relative position of the object to be inserted Q in relation to the hole H is controlled with no contact between these parts. Therefore, the time taken for the insertion operation S7 is reduced further and the insertion receiving object W can be effectively restrained from moving out of the movement range of the robot 200 before the insertion operation is completed.

The robot system 100 has been described above. Such a robot system 100 has: the conveyor device 600 conveying the insertion receiving object W, which is the first target object; the robot 200 performing the insertion operation S7 of inserting the object to be inserted Q, which is the second target object, into the insertion receiving object W with force control; and the control device 400 controlling the robot 200, as described above. The control device 400 controls the driving of the robot and thus performs: step S71 as the follow step of causing the object to be inserted Q to follow the insertion receiving object W from the operation start location L2, based on the conveyance speed of the insertion receiving object W; steps S72, S73, S74 as the contact step of bringing the object to be inserted Q into contact with the insertion receiving object W, the object to be inserted Q being in a tilted attitude in relation to the insertion receiving object W, with the force control; step S75 as the attitude change step of changing the attitude of the object to be inserted Q in such a way that the tilt in relation to the insertion receiving object W is eliminated, while pressing the object to be inserted Q against the insertion receiving object W, with the force control; and step S76 as the insertion step of inserting the object to be inserted Q into the insertion receiving object W. In such a method, before the object to be inserted Q is inserted into the hole H, the object to be inserted Q is pressed against the insertion receiving object W and the attitude of the object to be inserted Q in relation to the insertion receiving object W is adjusted in the pressed state. Therefore, the relative position of the object to be inserted Q in relation to the insertion receiving object W can be easily controlled. The object to be inserted Q is inserted into the insertion receiving object W smoothly and easily. Thus, the time taken for the insertion operation S7 is reduced further and the insertion receiving object W can be effectively restrained from moving out of the movement range of the robot 200 before the insertion operation is completed.

As described above, the robot control method for the robot 200 performing the insertion operation S7 of inserting the object to be inserted Q into the insertion receiving object W conveyed by the conveyor device 600, with force control, includes: step S71 as the follow step of causing the object to be inserted Q to follow the insertion receiving object W from the operation start location L2, based on the conveyance speed of the insertion receiving object W; steps S72, S73, S74 as the contact step of bringing the object to be inserted Q into contact with the insertion receiving object W, the object to be inserted Q being in a tilted attitude in relation to the insertion receiving object W, with the force control; step S75 as the attitude change step of changing the attitude of the object to be inserted Q in such a way that the tilt in relation to the insertion receiving object W is eliminated, while pressing the object to be inserted Q against the insertion receiving object W, with the force control; and step S76 as the insertion step of inserting the object to be inserted Q into the insertion receiving object W. In such a method, before the object to be inserted Q is inserted into the hole H, the object to be inserted Q is pressed against the insertion receiving object W and the attitude of the object to be inserted Q in relation to the insertion receiving object W is adjusted in the pressed state. Therefore, the relative position of the object to be inserted Q in relation to the insertion receiving object W can be easily controlled. The object to be inserted Q is inserted into the insertion receiving object W smoothly and easily. Thus, the time taken for the insertion operation S7 is reduced further and the insertion receiving object W can be effectively restrained from moving out of the movement range of the robot 200 before the insertion operation is completed.

As described above, the robot control method also includes step S77 as a release step of releasing the object to be inserted Q with the force control, after step S76. Thus, the application of an excessive stress to the object to be inserted Q, when being released, can be restrained.

As described above, the robot 200 has the force sensor 240 used for the force control. The robot control method includes step S4 as an initialization step of initializing the force sensor 240 in the state where the movement of the object to be inserted Q is a uniform motion, before steps S72, S73, S74. Thus, a noise signal generated due to factors other than the contact with the insertion receiving object W during the insertion operation S7 can be reduced, and the state of contact with the insertion receiving object W can be detected more accurately. Therefore, accurate force control can be performed and the insertion operation S7 can be performed accurately and smoothly.

As described above, in step S72, the object to be inserted Q is tilted in the direction opposite to the direction of conveyance of the insertion receiving object W, in relation to the insertion receiving object W. Thus, the object to be inserted Q can be inserted into the insertion receiving object W more smoothly and easily.

As described above, the hole H into which the object to be inserted Q is inserted is provided in the insertion receiving object W. The contact step includes step S73 as a first contact step of bringing the object to be inserted Q into contact with the first edge part H1 located downstream along the direction of conveyance, of the hole H, the object to be inserted Q being in the tilted attitude in relation to the insertion receiving object W, and step S74 as a second contact step of bringing the object to be inserted Q into contact with the second edge part H2 located upstream along the direction of conveyance, of the hole H. In such a method, the attitude of the object to be inserted Q in relation to the insertion receiving object W can be adjusted while the lateral surface Q2 of the object to be inserted Q is pressed against the insertion receiving object W. Thus, the relative position of the object to be inserted Q in relation to the insertion receiving object W can be accurately controlled.

Second Embodiment

Figure 10:
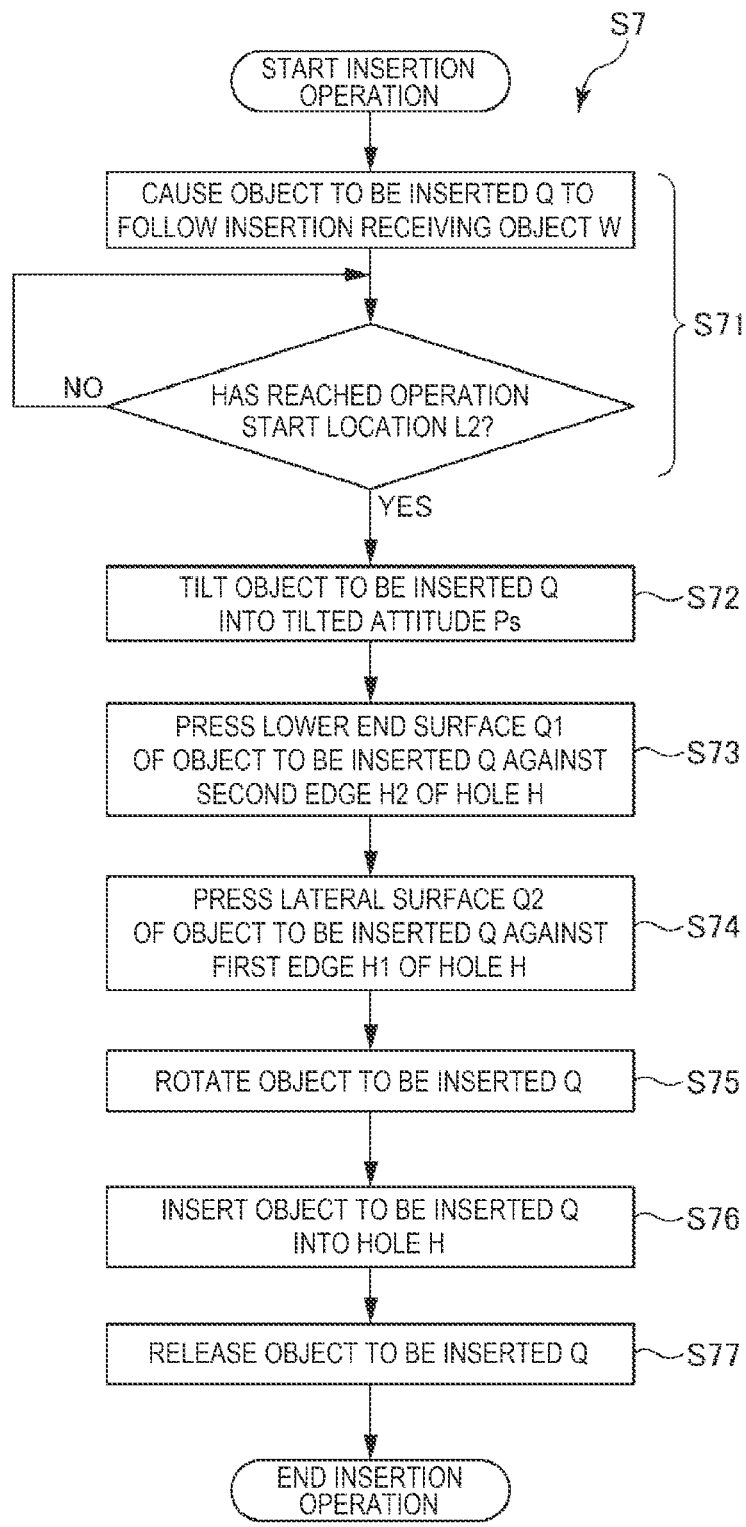
FIG. 10 is a flowchart showing a process of an insertion operation according to a second embodiment.

FIG. 10 is a flowchart showing a process of an insertion operation according to a second embodiment. FIGS. to 16 are cross-sectional views for explaining the insertion operation. The upper side in FIGS. 11 to 16 is the upper side in the vertical direction. The lower side in FIGS. 11 to 16 is the lower side in the vertical direction.

This embodiment is similar to the first embodiment except that the process of the insertion operation S7 is different. In the description below, the difference from the foregoing embodiment is mainly described and similar matters are not described further. In FIGS. 10 to 16, components similar to the components in the foregoing embodiment are denoted by the same reference signs.

The insertion operation S7 will now be described. First, in step S71, the control device 400 controls the driving of the robot 200 to cause the object to be inserted Q to continue following the insertion receiving object W until the insertion receiving object W reaches the operation start location L2 located downstream of the follow start location L1. When the insertion receiving object W has reached the operation start location L2, the control device 400 executes the steps described below while causing the object to be inserted Q to follow the insertion receiving object W.

Figure 11:
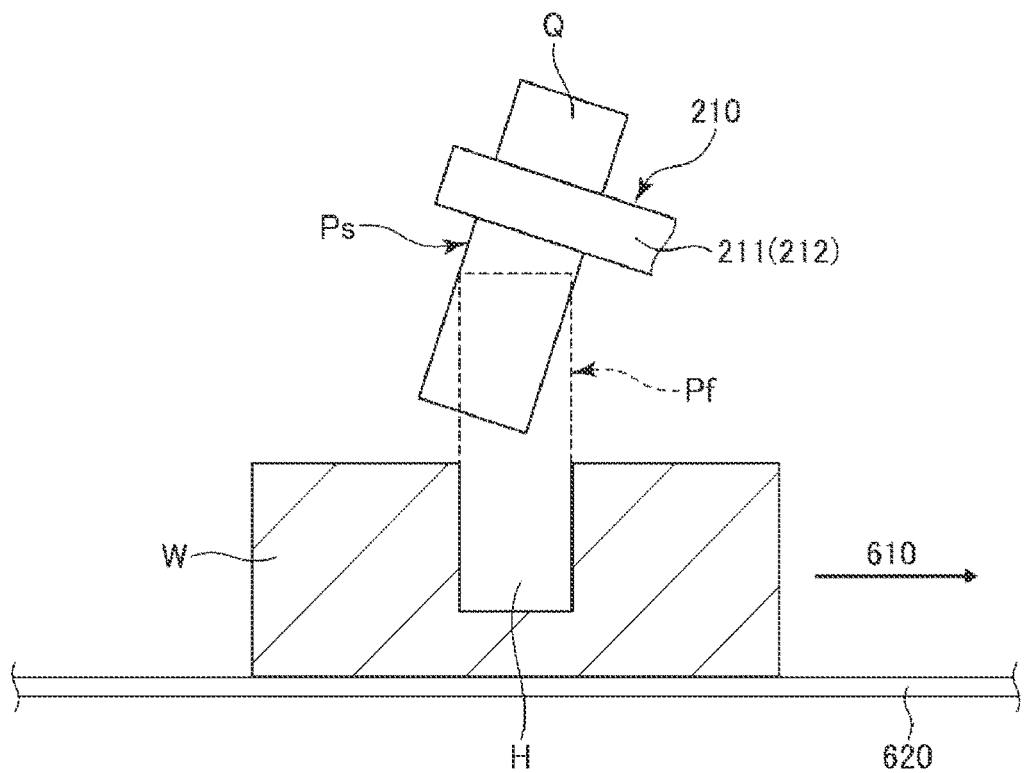
FIG. 11 is a cross-sectional view for explaining the insertion operation.

First, in step S72, the control device 400 controls the driving of the robot 200 to tilt the object to be inserted Q in relation to the insertion receiving object W and thus place the object to be inserted Q in the tilted attitude Ps, as shown in FIG. 11. In the tilted attitude Ps in this embodiment, the object to be inserted Q is tilted in the direction of conveyance 610 so that the insertion distal end (lower end) side of the object to be inserted Q is located upstream of the insertion proximal end (upper end) side of the object to be inserted Q along the direction of conveyance 610.

Figure 12:
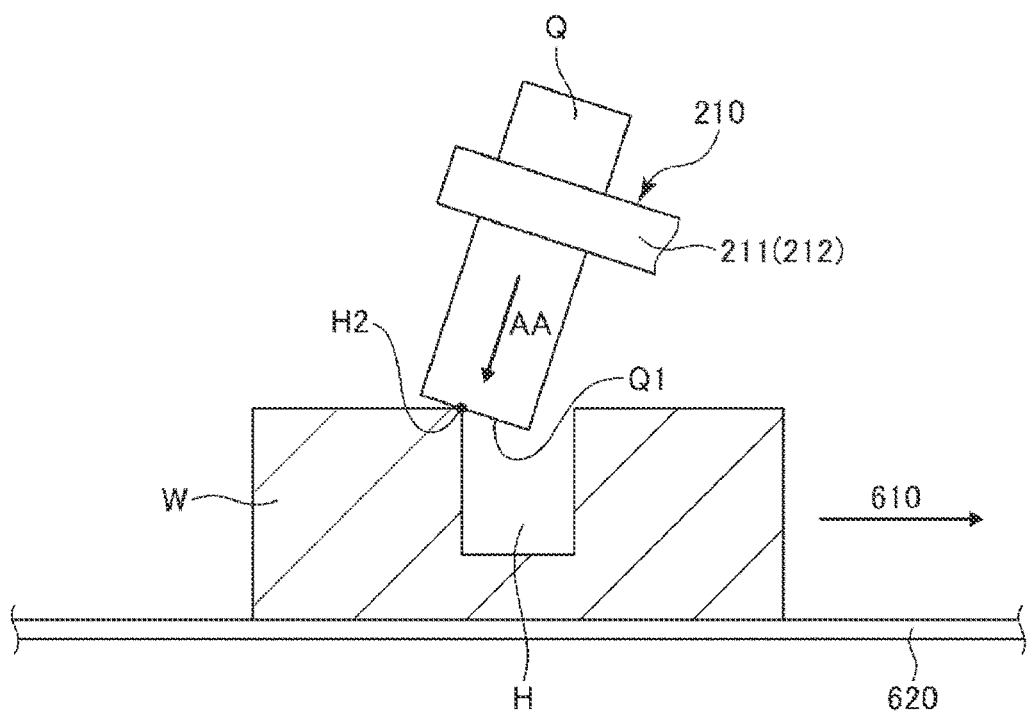
FIG. 12 is a cross-sectional view for explaining the insertion operation.

Next, in step S73, the control device 400 controls the driving of the robot 200 to move the object to be inserted Q toward the insertion receiving object W along an arrow AA indicating the tilting direction of the object to be inserted Q and thus press the lower end surface Q1 of the object to be inserted Q against the second edge part H2 of the hole H in the insertion receiving object W, while maintaining the object to be inserted Q in the tilted attitude Ps, as shown in FIG. 12. At this point, the control device 400 detects the contact between the object to be inserted Q and the second edge part H2 and controls the press force of the object to be inserted Q against the second edge part H2, based on the output from the force sensor 240.

Figure 13:
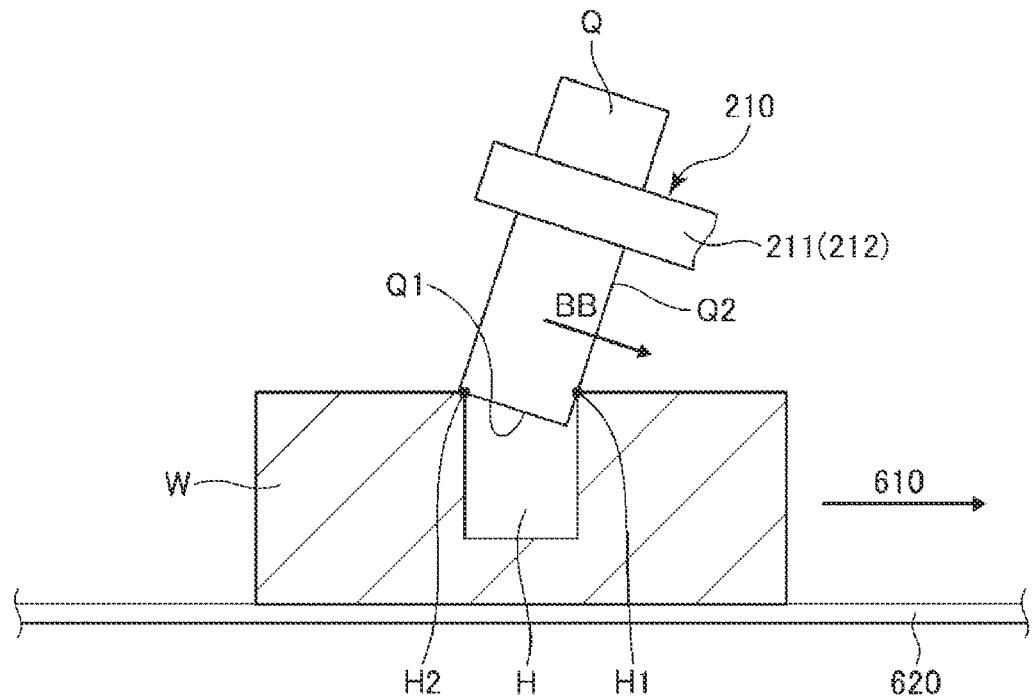
FIG. 13 is a cross-sectional view for explaining the insertion operation.

Next, in step S74, the control device 400 controls the driving of the robot 200 to move the object to be inserted Q downstream along the direction of conveyance 610, along an arrow BB orthogonal to the arrow AA, while pressing the lower end surface Q1 against the second edge part H2, and thus press the lateral surface Q2 of the object to be inserted Q against the first edge part H1, while maintaining the object to be inserted Q in the tilted attitude Ps, as shown in FIG. 13. At this point, the control device 400 controls the press force of the object to be inserted Q against the second edge part H2, detects the contact between the lateral surface Q2 and the first edge part H1, and controls the press force of the object to be inserted Q against the first edge part H1, based on the output from the force sensor 240.

Figure 14:
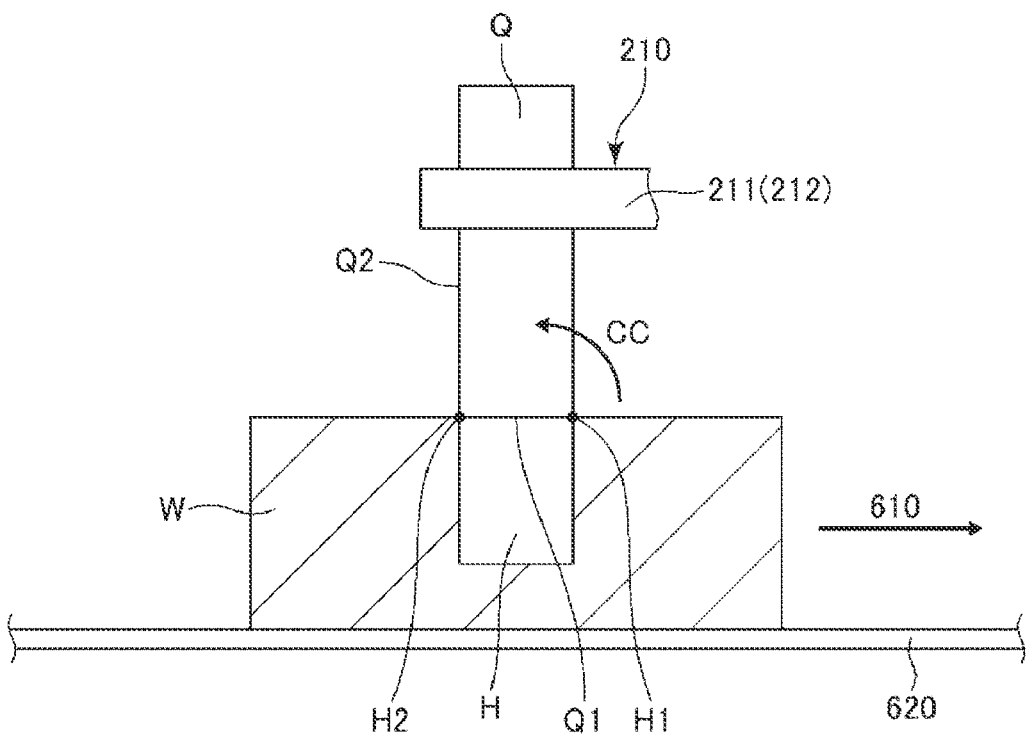
FIG. 14 is a cross-sectional view for explaining the insertion operation.

Next, in step S75, the control device 400 controls the driving of the robot 200 to rotate the object to be inserted Q as indicated by an arrow CC about the first edge part H1 as the fulcrum until the tilt in relation to the completion attitude Pf is substantially eliminated, while pressing the lateral surface Q2 of the object to be inserted Q against the first edge part H1, as shown in FIG. 14. At this point, the control device 400 controls the driving of the robot 200 in such a way that the press force of the object to be inserted Q against the first edge part H1 is maintained to be a target press force.

Figure 15:
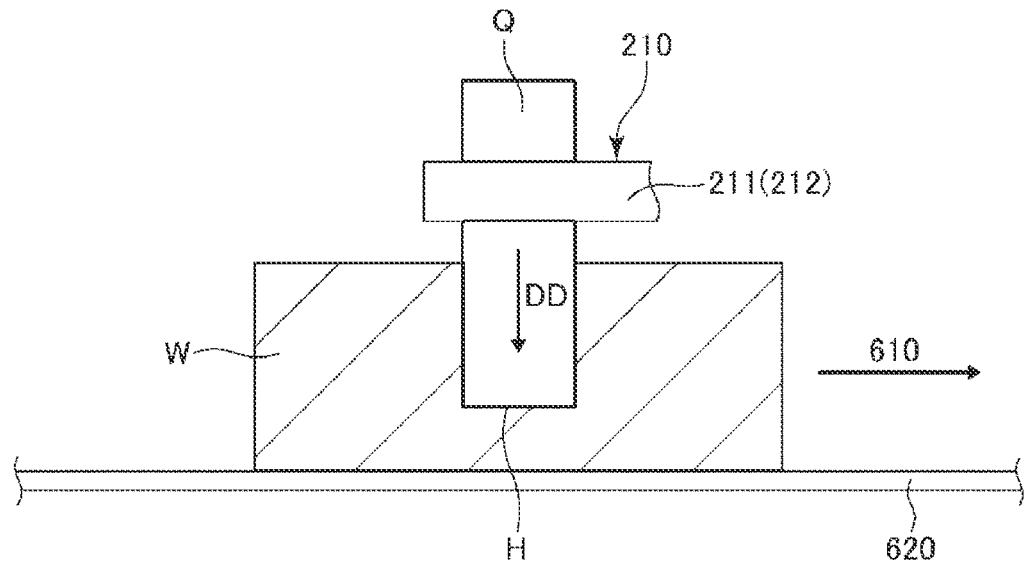
FIG. 15 is a cross-sectional view for explaining the insertion operation.

Next, in step S76, the control device 400 controls the driving of the robot 200 to move the object to be inserted Q downward along an arrow DD pointing vertically downward and thus insert the object to be inserted Q into the hole H, as shown in FIG. 15. At this point, the control device 400 detects the completion of the insertion of the object to be inserted Q, based on the output from the force sensor 240. The insertion of the object to be inserted Q into the hole H is thus completed. Steps S75, S76 are executed in two actions but may be executed in one action, that is, simultaneously. In short, the object to be inserted Q may be energized downward along the arrow DD and rotated along the arrow CC about the first edge part H1 as the fulcrum at the same time. Thus, the object to be inserted Q is inserted into the hole H, at the point when the tilt is reduced and the object to be inserted Q is placed in an attitude where the object to be inserted Q can be inserted into the hole H.

Figure 16:
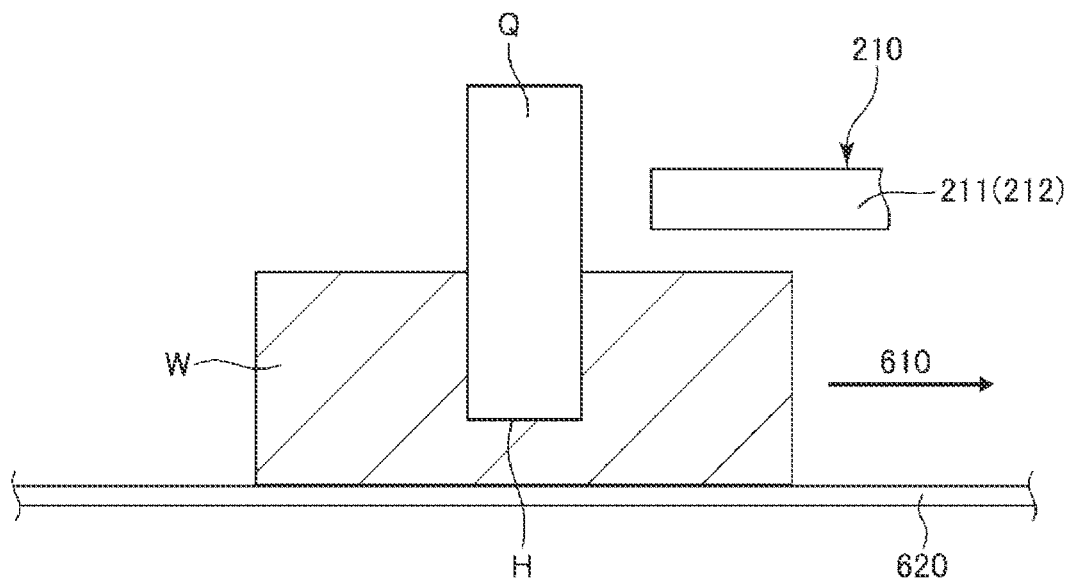
FIG. 16 is a cross-sectional view for explaining the insertion operation.

Next, in step S77, the control device 400 controls the driving of the robot 200 to release the object to be inserted Q from the end effector 210, as shown in FIG. 16. At this point, the control device 400 releases the object to be inserted Q while controlling the state of contact between the end effector 210 and the object to be inserted Q, based on the output from the force sensor 240, so that an excessive stress is not applied to the object to be inserted Q. In short, the control device 400 executes feedback control to make the stress indicated by the output from the force sensor 240 equal to or less than a predetermined threshold, during the release operation. Thus, the application of an excessive stress to the object to be inserted Q, when being released, can be restrained.

In such a method, before the object to be inserted Q is inserted into the hole H, the object to be inserted Q is pressed against the hole H and the attitude of the object to be inserted Q in relation to the hole H is adjusted in the pressed state. Therefore, the relative position of the object to be inserted Q in relation to the hole H can be easily controlled. The object to be inserted Q is inserted into the hole H more smoothly and easily than, for example, when the relative position of the object to be inserted Q in relation to the hole H is controlled with no contact between these parts. Therefore, the time taken for the insertion operation S7 is reduced further and the insertion receiving object W can be effectively restrained from moving out of the movement range of the robot 200 before the insertion operation is completed.

Such a second embodiment can achieve effects similar to those of the first embodiment.

The robot control method and the robot system according to the disclosure have been described, based on the illustrated embodiments. However, the disclosure is not limited to these embodiments. The configuration of each part can be replaced with any configuration having similar functions. Any other component may be added to the disclosure. Also, the embodiments may be suitably combined together. Another process may be added to the insertion operation.

In the embodiments, the robot 200 is fixed to the floor and the manipulator 220 is driven to cause the object to be inserted Q to follow the insertion receiving object W. However, this is not limiting. For example, the base 230 may be fixed to a moving unit such as an automatic guided vehicle (AGV), and the moving unit may run parallel to the insertion receiving object W conveyed by the conveyor device 600, thus causing the object to be inserted Q to follow the insertion receiving object W.

What is claimed is:

1. A robot control method for causing a processor to execute a process to cause a robot to perform an insertion operation of inserting a second target object with force control into a first target object conveyed by a conveyer, the robot control method comprising:

a follow step of causing the second target object to follow the first target object from an operation start location, based on a conveyance speed of the first target object;

a contact step of bringing the second target object into contact with the first target object, the second target object being in a tilted attitude in relation to the first target object, with the force control;

an attitude change step of changing the attitude of the second target object in such a way that the tilt in relation to the first target object is eliminated, while pressing the second target object against the first target object, with the force control; and an insertion step of inserting the second target object into the first target object, wherein, in the contact step, the second target object is tilted toward a direction opposite to a direction of the conveyance of the first target object, in relation to the first target object.

2. The robot control method according to claim 1, further comprising:

a release step of releasing the second target object with the force control, after the insertion step.

3. The robot control method according to claim 1, wherein the robot has a force sensor used for the force control, and the robot control method further comprises an initialization step of initializing the force sensor in a state where a movement of the second target object is a uniform motion, before the contact step.

4. The robot control method according to claim 1, wherein a hole into which the second target object is inserted is provided in the first target object, and the contact step includes a first contact step of bringing the second target object into contact with a first edge part located downstream along the direction of conveyance, of the hole, the second target object being in the tilted attitude in relation to the first target object, and a second contact step of bringing the second target object into contact with a second edge part located upstream along the direction of conveyance, of the hole.

5. A robot system comprising:

a conveyer conveying a first target object;

a robot performing an insertion operation of inserting a second target object into the first target object with force control; and a control device controlling the robot, the control device controlling driving of the robot to perform:

a follow step of causing the second target object to follow the first target object from an operation start location, based on a conveyance speed of the first target object;

a contact step of bringing the second target object into contact with the first target object, the second target object being in a tilted attitude in relation to the first target object, with the force control;

an attitude change step of changing the attitude of the second target object in such a way that the tilt in relation to the first target object is eliminated, while pressing the second target object against the first target object, with the force control; and an insertion step of inserting the second target object into the first target object, wherein, in the contact step, the second target object is tilted toward a direction opposite to a direction of the conveyance of the first target object, in relation to the first target object.

\* \* \* \* \*